(12) United States Patent
Schwalbe et al.

(10) Patent No.: US 11,234,431 B2
(45) Date of Patent: *Feb. 1, 2022

(54) FRONT-BOOM SPRAYER WITH IMPROVED FIELD OF VIEW

(71) Applicant: CNH Industrial America LLC, New Holland, PA (US)

(72) Inventors: Blaine A. Schwalbe, Valders, WI (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/782,609

(22) Filed: Feb. 5, 2020

(65) Prior Publication Data

US 2020/0170235 A1 Jun. 4, 2020

Related U.S. Application Data

(62) Division of application No. 15/837,517, filed on Dec. 11, 2017, now Pat. No. 10,667,507.

(51) Int. Cl.
| | | |
|---|---|---|
| *A01M 7/00* | (2006.01) | |
| *B05B 1/20* | (2006.01) | |
| *B05B 13/00* | (2006.01) | |
| *B05B 15/68* | (2018.01) | |
| *A01B 59/06* | (2006.01) | |

(52) U.S. Cl.
CPC ........ *A01M 7/0053* (2013.01); *A01M 7/0014* (2013.01); *A01M 7/0071* (2013.01); *A01M 7/0082* (2013.01); *B05B 1/20* (2013.01); *A01B 59/064* (2013.01); *B05B 13/005* (2013.01); *B05B 15/68* (2018.02)

(58) Field of Classification Search
CPC .............. A01M 7/0053; A01M 7/0014; A01M 7/0071; A01M 7/0082
See application file for complete search history.

(56) References Cited

U.S. PATENT DOCUMENTS

| | | | | |
|---|---|---|---|---|
| 4,125,271 A | * | 11/1978 | Wiboltt | A01B 59/064 280/461.1 |
| 4,880,160 A | * | 11/1989 | Patterson | A01M 7/0053 239/167 |
| 5,375,767 A | * | 12/1994 | Thorstensson | A01M 7/0053 239/164 |
| 5,992,759 A | * | 11/1999 | Patterson | A01C 23/00 239/159 |
| 6,047,901 A | * | 4/2000 | Pederson | A01M 7/0053 239/159 |
| 6,315,218 B1 | * | 11/2001 | Guesdon | A01M 7/0053 239/159 |

(Continued)

*Primary Examiner* — Joseph A Greenlund
(74) *Attorney, Agent, or Firm* — Rebecca L. Henkel; Rickard K. DeMille (57) ABSTRACT

A front-boom sprayer is provided that includes a boom center section and lift arm arrangement that provides a field of view below the boom when the boom is in a raised state that is substantially free of view obstructions from torque tube or other crosswise-extending components. The lift arm arrangement may provide different link tube geometries so that the respective left and right pairs of upper and lower lift arms align with each other in the line of sight of the in-cab operator.

3 Claims, 8 Drawing Sheets

(56) References Cited

U.S. PATENT DOCUMENTS

| | | | | |
|---|---|---|---|---|
| 6,343,661 B1* | 2/2002 | Thompson | A01C 23/008 | 172/444 |
| 6,454,294 B1* | 9/2002 | Bittner | B60G 99/00 | 280/677 |
| 7,150,419 B1* | 12/2006 | Tomlonovic | A01M 7/0053 | 239/722 |
| 8,464,967 B2 | 6/2013 | Kuphal et al. | | |
| 8,827,180 B2* | 9/2014 | Honermann | A01M 7/0071 | 239/168 |
| 9,258,989 B2* | 2/2016 | Barker | B60P 3/2245 | |
| 9,485,899 B2* | 11/2016 | Ribo | A01B 59/064 | |
| 9,578,868 B2 | 2/2017 | Jones et al. | | |
| D840,440 S* | 2/2019 | Schwalbe | D15/28 | |
| 10,343,180 B2* | 7/2019 | Rouyer | A01M 7/0057 | |
| 2002/0125018 A1* | 9/2002 | Bernhardt | A01B 59/068 | 172/439 |
| 2004/0231308 A1* | 11/2004 | Murphy | A01M 7/0057 | 56/14.9 |
| 2007/0098538 A1* | 5/2007 | Zettel | E02F 3/3604 | 414/723 |
| 2007/0181710 A1* | 8/2007 | Meyer | A01M 7/0053 | 239/159 |
| 2009/0084566 A1* | 4/2009 | Bernhardt | A01B 59/066 | 172/444 |
| 2009/0173802 A1* | 7/2009 | Theeuwen | A01C 23/008 | 239/164 |
| 2011/0139895 A1* | 6/2011 | Kuphal | A01M 7/0053 | 239/166 |
| 2011/0147020 A1* | 6/2011 | Waltz | A01B 59/064 | 172/439 |
| 2012/0043396 A1* | 2/2012 | Joris | A01M 7/0057 | 239/164 |
| 2012/0112021 A1* | 5/2012 | Kempers | A01M 7/0053 | 248/201 |
| 2013/0062082 A1* | 3/2013 | Layton | A01B 71/063 | 172/445.1 |
| 2014/0151077 A1* | 6/2014 | Rollenhagen | A01B 59/06 | 172/675 |
| 2014/0197297 A1* | 7/2014 | Ito | A01M 7/0057 | 248/550 |
| 2015/0230388 A1* | 8/2015 | Ribo | A01B 71/063 | 248/653 |
| 2016/0316734 A1* | 11/2016 | Pilney | A01C 23/008 | |
| 2016/0316737 A1* | 11/2016 | Pilney | A01C 23/008 | |
| 2016/0319935 A1* | 11/2016 | Bittner | F16H 63/42 | |
| 2017/0020121 A1* | 1/2017 | Itou | A01M 7/0075 | |
| 2017/0064905 A1* | 3/2017 | Rotole | A01B 59/064 | |
| 2017/0164599 A1* | 6/2017 | Ito | A01G 25/09 | |
| 2019/0133021 A1* | 5/2019 | Schwalbe | A01B 59/064 | |
| 2019/0141884 A1* | 5/2019 | Pilney | A01M 7/0082 | 180/209 |
| 2019/0174737 A1* | 6/2019 | Schwalbe | B05B 1/20 | |
| 2019/0176560 A1* | 6/2019 | Bittner | B60G 17/0165 | |

* cited by examiner

FRONT-BOOM SPRAYER WITH IMPROVED FIELD OF VIEW

CROSS-REFERENCE TO RELATED APPLICATION

This application is a division of U.S. Ser. No. 15/837,517, filed Dec. 11, 2017, the entirety of which is incorporated herein.

FIELD OF THE INVENTION

The invention relates generally to agricultural machines including agricultural product application equipment such as self-propelled sprayers and, in particular, to a front-boom sprayer with a boom center section and lift arm arrangement that provide an improved field of view.

BACKGROUND OF THE INVENTION

High-clearance sprayers are getting larger and more complex, including front boom sprayers with long booms that can be heavy and can apply large twisting and other loads to the sprayer chassis during use. In order to carry the heavy weights and handle the large loads of the booms, the booms have complex boom attachment systems that include large boom center sections that are supported by large lift arms, some of which are interconnected by torque tubes. However, in front-boom sprayers, the large boom center sections, lift arms, and torque tubes can compromise the view of the operator. Some previous front-boom sprayers have lift arms without torque tubes, but with upper and lower lift arms that extend outwardly from their inner ends at connection points to the chassis to their outer ends at the boom center section. In these previous front-boom sprayers, the inner ends of the upper lift arms are spaced fairly close to each other, more narrowly than inner ends of the lower lift arms. These upper lift arms extended outwardly at fairly sharp angles to their outer ends so that the outer ends of the upper lift arms were spaced farther from each other than outer ends of the lower lift arms at the boom center section connection points. This previous arrangement provides wide crisscrossing view blockages of the lift arms from near the centerline of the sprayer outwardly toward outer ends of the boom center section. Other previous front-boom sprayers have parallel and aligned upper and lower lift arms that define parallelogram linkages with torque tubes that connect the outer ends of the upper lift arms to each other. This previous arrangement provides wide parallel view blockages of the lift arms and a horizontal view blockage from the torque tube(s), especially at certain boom heights.

SUMMARY OF THE INVENTION

A front-boom sprayer is provided with a boom center section and lift arm arrangement for improved field of view compared to, for example, boom lift arms that are connected with torque tubes.

According to one aspect of the invention, upper and lower lift arms have link tubes that provide different link tube geometries so that the respective left and right pairs of upper and lower lift arms align with each other in the line of sight of the in-cab operator. This in-cab visual alignment of the upper and lower lift arms at each of the left and right sides, along with the torque member adjacent the sprayer chassis instead of a torque tube, provides a substantially unobstructed view through the front of the cab.

According to one aspect of the invention, the lift arm arrangement has no view-obstructing torque tube. Instead, a torque member is provided by a weldment that may have webbed gussets that interconnect and supplement the strength of the lower lift arms adjacent the sprayer chassis. The upper and lower lift arms may have link tubes that provide different link tube geometries that define a double partially-triangulated 4-link having different angles with respect to the sprayer's centerline. At each of the left and right pairs of lift arms, a triangle may be defined in the top view by the upper and lower lift arm on each side of the sprayer that forms a natural gusset or triangulated stabilizer. This improves the lateral rigidity of the system due to the wider positioning of the lower lift arm outer ends than those of the upper lift arms. This configuration reduces the need for lateral supports, which lowers cost and weight.

According to another aspect of the invention, at the inner ends of the lift arms closest to the sprayer cab, the link tube geometry provides machine link connection points of the upper and lower lift arms that are vertically aligned as a stack at each of the left and right sides. At the outer ends of the lift arms closest to the boom, the link tube geometry provides vertically misaligned connection points of the upper and lower lift arms at each of the left and right sides. The boom center section and lift arm outer ends have connection points with the lower lift arms spaced farther from each other than the connection points of the upper lift arms. In this way, the upper lift arms extend closer to parallel to the centerline of the sprayer and the lower lift arms extend at greater angles with respect to the sprayer centerline. The different link tube geometries may be provided with arm ends that are common castings, which provide fewer parts to inventory. Cutting the link tube ends that connect to the arm ends at different angles provides the different overall geometry of the upper and lower lift arms even though common casting arm ends are used. As one example, the lower link tubes can be cut straight or perpendicular and, the top link tubes can be cut at angles so that the upper and lower arms define different angles with respect to the sprayer centerline.

According to another aspect of the invention, the upper and lower lift arms can be made slightly different lengths (in the side view) to not only compensate for droop due to the side loading of the non-planer parallel linkage, but also allow a different height for the end of the primary when folded than when deployed. This could be arranged such that the wing or boom arm can rise high in the operating position, but not overshoot the saddle of a boom rest when folded.

According to another aspect of the invention, an angled plate connects the lower lift arms to each other as a segment of a weldment that defines the torque member and also provides a crop deflector that acts as a transition to the sprayer's belly pan.

According to another aspect of the invention, a boom center section has a left end for supporting a left boom arm and a right end for supporting a right boom arm. The boom center section may include a cross-member that defines cross-member left and right ends and extends transversely with respect to a centerline of the sprayer. Left and right boom arm mounts are arranged at the center section left and right ends and are configured to support the left and right boom arms. The left and right boom arm mounts extend downwardly from the cross-member left and right ends. The boom center section may define an upside down U-shaped body with an open lower end that is defined below a center section cross-member lower edge and between the left and right boom mounts that extend downwardly cross-member. A lift arm arrangement connects the sprayer boom to the chassis front end. The lift arm arrangement includes a pair of upper lift arms, such as a left and right upper lift arm with an outer end connected to the cross-member left end and a right upper lift arm with an outer end connected to the cross-member right end. The left and right upper lift arms are spaced from each other by a first distance. A pair of lower lift arms includes left and right lower lift arms with outer ends that are connected to the cross-member right end. The outer ends of the left and right lower lift arms are spaced from each other by a second distance that is greater than the first distance. When the boom is in a raised position with the boom center section above an eye level of an operator in a cab of the sprayer, an under-boom field-of-view window is defined as an opening that is bounded from above by the lower edge of the center section cross-member and at least partially bounded at left and right sides by the inner edges of the left and right boom mounts.

According to another aspect of invention, a torque member is provided that may include a torque member plate that extends between inner ends of the left and right lower lift arms. The torque member may define a U-shaped body that may include curved gussets that provide at least part of a lower boundary to the under-boom field-of-view window.

According to another aspect of the invention, a pair of chassis lift arm mounts are provided at the chassis front end for connecting the inner ends of the upper and lower lift arms to the chassis front end. Each chassis lift arm mount may include an upper lift arm receiver and a lower lift arm receiver that accepts an inner end of a respective upper and lower lift arm and wherein the upper and lower lift arm receivers at each lift arm mount are vertically aligned with each other and the upper and lower lift arms may extend from the upper and lower lift arm receivers at different angles. The lower lift arms may extend at a greater angle with respect to a sprayer centerline than the upper lift arms. Each of the link arms may include a link tube and an arm end at each of their inner and outer ends.

The arm ends may be a common component or have a common configuration with respect to the other arm ends. The arm ends may be angled from inner ends that are attached to the link tubes to outer ends that are attached to the boom center section or the chassis lift arm mount. The ends of the upper and lower link tubes may be cut to different angles for attaching to the arm ends. When viewed from above, the ends of the lower lift arm link tubes may be perpendicular with respect to a longitudinal axis of the link tube of the lower lift arms and the ends of the upper lift arm link tubes may be angled.

According to another aspect of the invention, the torque member may include side plates that extend from the inner ends of the lower lift arms to their outer ends. The side plates may be generally triangular and taper downwardly from the inner ends of the lower lift arms to their outer ends.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
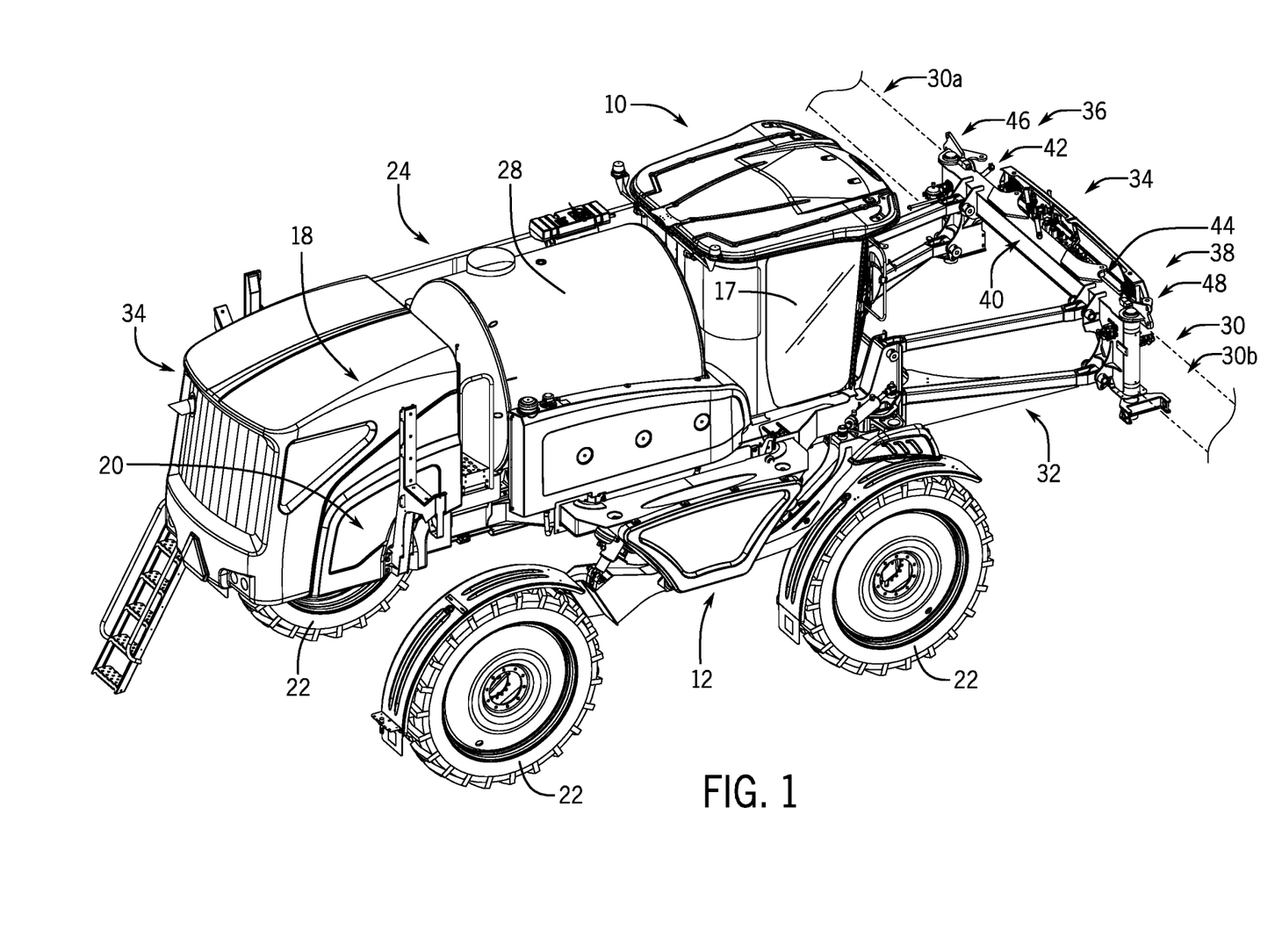
FIG. 1 is an isometric view of a front-boom sprayer with a boom center section and lift arm arrangement for improved field of view in accordance with the present invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Sprayer 10 is shown as a front-boom sprayer, such as those available from CNH Industrial, including the Miller Nitro sprayers and New Holland Guardian Series sprayers.

Still referring to FIG. 1, sprayer 10 includes a chassis 12 having front and back ends and a chassis frame that supports various assemblies, systems, and components. These various assemblies, systems, and components can include an operator cab 16 in a forward position toward the front end of the chassis 12 and sprayer 10. Engine 18 and a hydraulic system 20 are shown in a rearward position toward the back end of the sprayer chassis 12. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system or application system 24 is supported by the chassis 12 and can include storage containers such as a rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with a lift arm assembly or arrangement 32 that is attached to a boom center section 34 and is configured to move the boom 30 up and down for adjusting the height of application of the product. Boom 30 has multiple interconnected boom segments that collectively define each of a left and right boom arm 30a, 30b that extend in opposite directions from a boom center section 34 that is carried by the lift arm arrangement 32. The boom segments of the left and right boom arms 30a, 30b are configured along with corresponding actuators to allow the boom 30 to fold into a transport position or extend out into it as an in-use or spray position.

Figure 2:
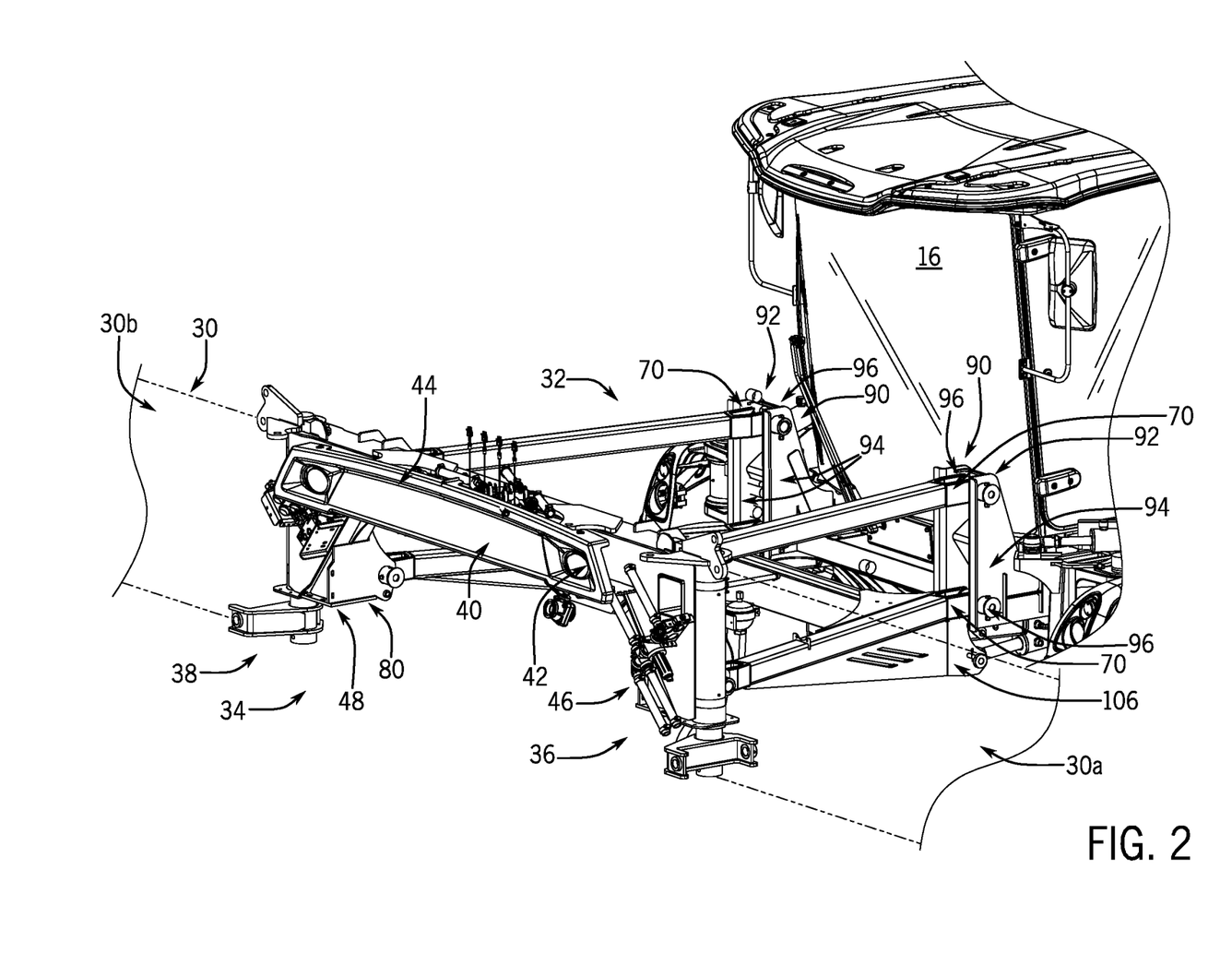
FIG. 2 is an isometric view of a portion of the sprayer on FIG. 1.

Referring not to FIGS. 1 and 2, boom center section 34 has first and second ends, shown here as a left end 36 for supporting a left boom arm and a right end 38 for supporting a right boom arm. The boom center section 34 has a cross-member 40 that extends transversely with respect to a centerline of the sprayer and defines cross-member left and right ends 42, 44. Left and right boom arm mounts 46, 48 are arranged at the center section left and right ends 36, 38 and are configured to support the left and right boom arms 30a, 30b. The left and right boom arm mounts 46, 48 extend downwardly from the cross-member left and right ends 42, 44 and have generally vertical outer walls at which the joints are arranged for it mounting the left and right boom arms 30a, 30b. Each of the boom arm mounts 46, 48 has a generally triangular body that is wider toward its top portion at the cross-member 40 and tapers downwardly toward its lower portion. As shown in FIG. 2, this gives the center section 34 an upside down U-shaped body with a lower recess defined by a perimeter with a raised upper perimeter wall segment that is defined by a lower edge of the center section cross-member 40 and side perimeter wall segments that are defined by inner edges of the left and right boom mounts 46, 48 that extend downwardly, shown extending downwardly and outwardly at an angle, from the upper perimeter wall segment at the lower edge of cross-member 40.

Figure 3:
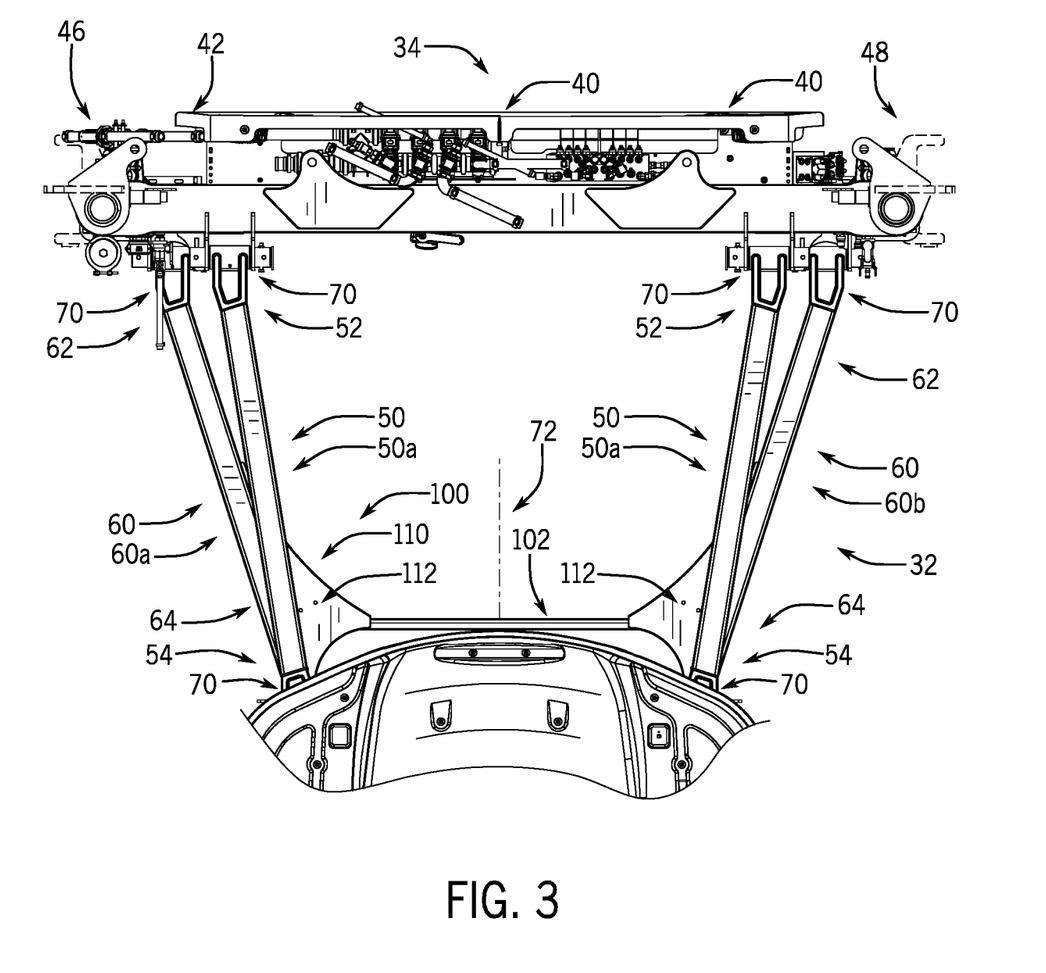
FIG. 3 is top plan view of portions of the sprayer of FIG. 1.
Figure 4:
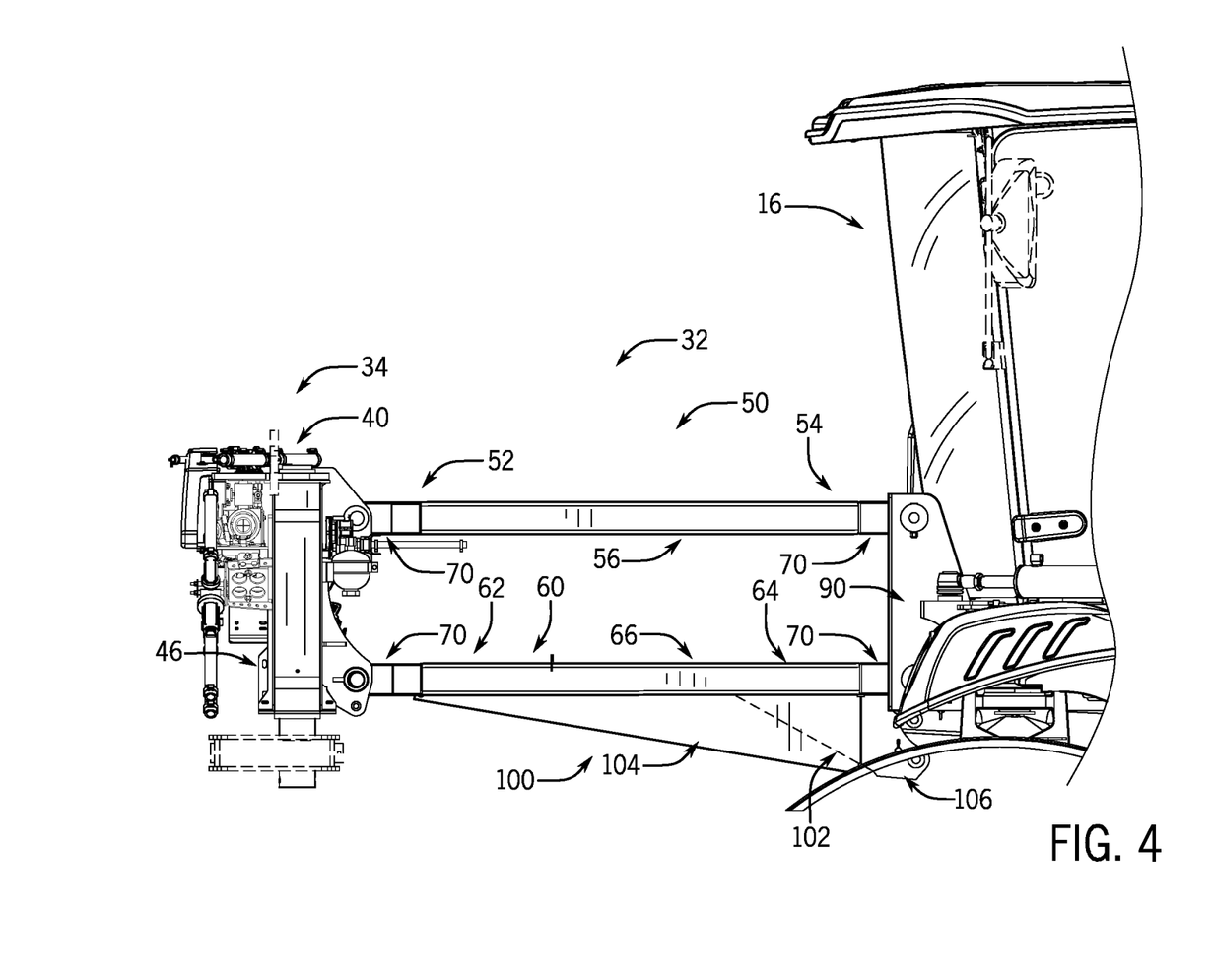
FIG. 4 is side elevation view of portions of the sprayer of FIG. 1.

Referring now to FIGS. 3-4, the lift arm arrangement includes a pair of upper lift arms 50, such as left and right upper lift arms 50a, 50b (FIG. 3), with outer ends 52 connected to the cross-member left and right ends 42, 44 and inner ends 54 connected to the front end of sprayer chassis 12 (FIG. 1). Each upper lift arm 50 has a link tube 56 with outer and inner ends arranged at the lift arm outer and inner ends 52, 54. A pair of lower lift arms 60, such as left and right lower lift arms 60a, 60b (FIG. 3), with outer ends 62 connected to the cross-member left and right ends 42, 44 and inner ends 64 connected to the front end of sprayer chassis 12 (FIG. 1). Each lower lift arm 60 has a link tube 66 with outer and inner ends arranged at the lift arm outer and inner ends 62, 64. Arm ends 70 are attached to the ends of the link tubes 56, 66 of the upper and lower lift arms 50, 60, such as by welding, and provides the features such as an end knuckle with a bore for connecting the lift arms 50, 60 to the corresponding mounting components of the sprayer chassis 12 and center section 34. Arm ends 70 are shown as common components with the same configuration, such as a single inventoried part. As seen in FIG. 3, each arm end 70 has a first side wall, such as an inside side wall, that extends along a straight line path and a second side wall, such as an outside side wall, that is segmented with these segments extending angularly with respect to each other. Arm end 70 has a back or inner wall that is angled with respect to a bore that extends through a knuckle at a forward or outer end of arm end 70.

Referring now to FIG. 3, even though the arm ends 70 are the same for all of the upper and lower lift arms 50, 60, the upper and lower lift arms 50, 60 extend at different angles with respect to each other relative to a centerline 72 of sprayer 10. This may be achieved by cutting ends of the link tubes 56, 66 of upper and lower lift arms 50, 60 at different angles before attaching the arm ends 70. Lower lift arm 60 extends at greater angles with respect to the sprayer centerline 72 than the upper lift arms 50. The end of the upper lift arm link tube(s) 56 is cut to an angled end when viewed from above, which provides a relatively lesser angle between a longitudinal axis of the upper lift arm link tube 56 with respect to a bore that runs through the knuckle at the outer end of arm end 70. That is because the angles of the cut end(s) of upper lift arm 56 and the angled back wall of arm end 70 are arranged with respect to each other to lessen the overall angle defined between longitudinal axis of the upper lift arm link tube 56 with respect to the board that runs through the knuckle at the outer end of arm end 70. The end of the lower lift arm link tube(s) 66 is cut to a perpendicular end when viewed from above, which provides a relatively greater angle between a longitudinal axis of the lower lift arm link tube 66 with respect to a bore that runs through the knuckle at the outer end of arm end 70, which corresponds to the angle between the back wall of arm end 70 relative to the bore through the knuckle at the outer end of arm end 70.

Still referring to FIG. 3, at each side of the lift arm arrangement 32, the outer ends 52, 62 of the respective upper and lower lift arms 50, 60 are vertically staggered or misaligned with each other at their attention points to the boom center section 34. Also, at each side of the lift arm arrangement 32, the inner ends 54, 64 of the respective upper and lower lift arm 50, 60 are vertically stacked or aligned with each other at their attention points to the front end of sprayer chassis 12 (FIG. 2).

Figure 5:
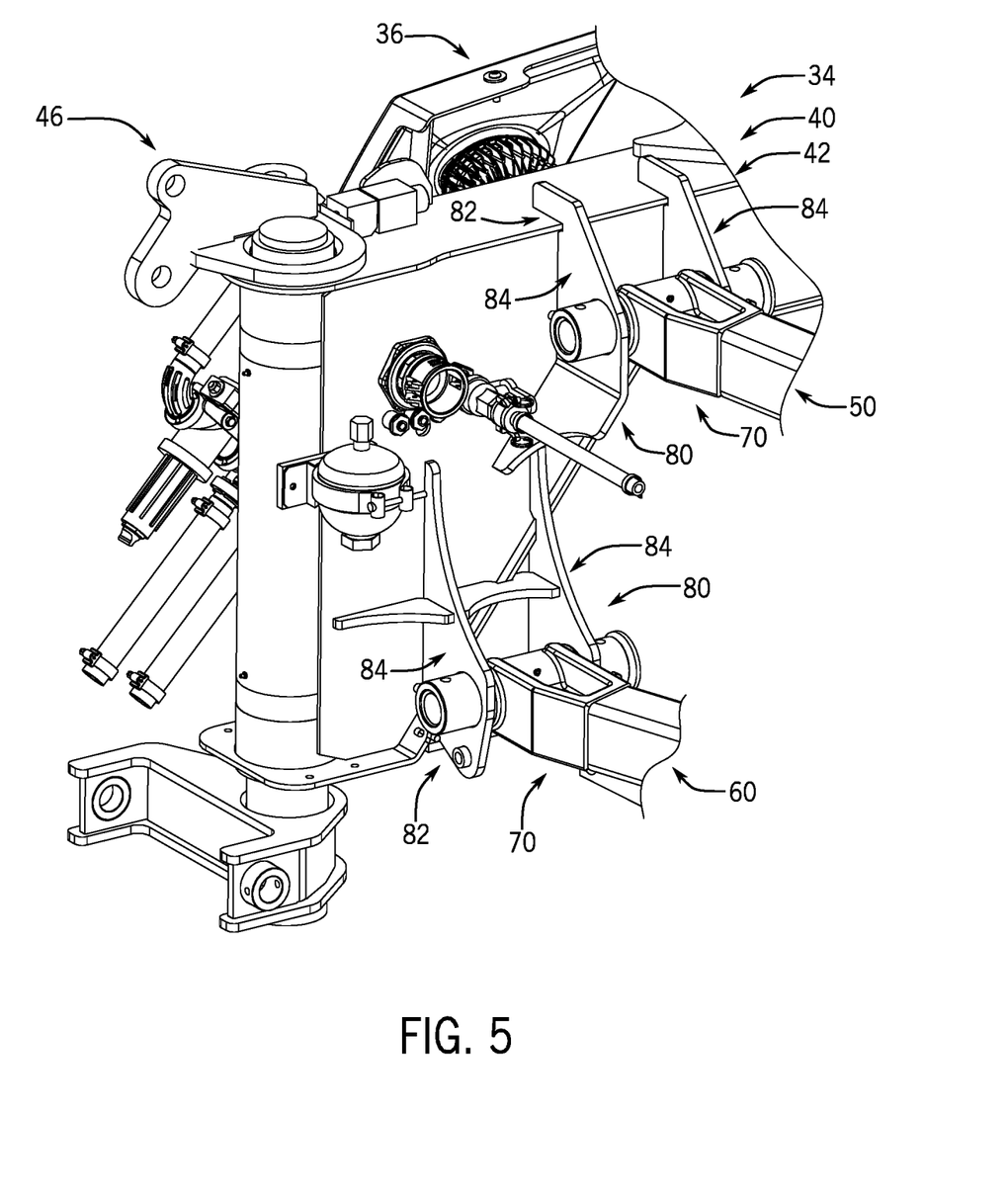
FIG. 5 is an enlarged isometric view of a portion of the lift arm arrangement of FIG. 1.
Figure 6:
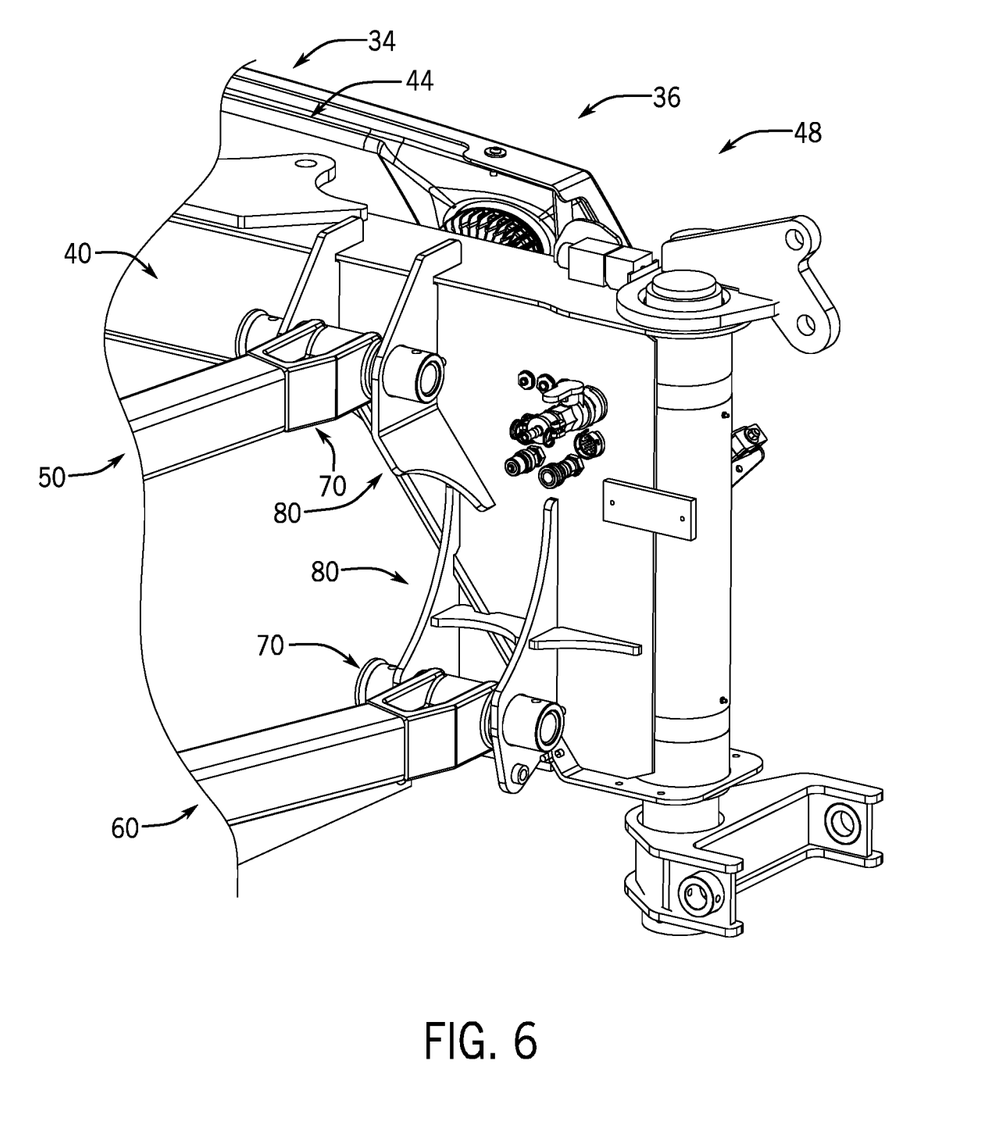
FIG. 6 is another enlarged isometric view of a portion of the lift arm arrangement of FIG. 1.

Referring now to FIGS. 5-6, center section lift arm mounts 80 are arranged at each side of the center section left and right ends 36, 38. Each lift arm mount 80 has a bracket 82 that extends from a rearward facing surface of the respective boom arm mount(s) 46, 48 and has a pair of bracket side walls 84 that define a space between them which receives the arm end 70. The bracket 82 of each lift arm mount 80 is configured to pivot mount the respective arm end 70 about a pin that extends through the sidewalls 84 and the bore of the knuckle at the outer end of arm end 70. The pins in the lift upper and lower arm mounts 80 at each side of the center section 34 extend parallel to each other and are vertically and horizontally staggered with respect to each other to attach the outer ends of upper and lower lift arms 50, 60 to the center section 34.

Referring now to FIG. 2, inner ends of upper and lower lift arms 50, 60 are attached to the front end of sprayer chassis 12 (FIG. 1) with chassis lift arm mounts 90. Chassis lift arm mounts 90 are arranged at each side of the chassis 12 (FIG. 1) and may be provided by integral or connected components to the chassis frame. Each lift arm mount 90 has a bracket 92 that extends from a forward facing end of the chassis (FIG. 1) and has a pair of bracket side walls 94 that define a space between them which receives the arm end 70. The mounting arrangement of each arm end 70 within the bracket 92 defines a lift arm receiver 96 that is configured to pivot mount the respective arm end 70 about a pin that extends through the sidewalls 94 and the bore of the knuckle at the outer end of arm end 70. The pins in the lift arm receiver(s) 96 at each side of the center section 34 extend parallel to each other and are vertically aligned or stacked with respect to each other to attach the outer ends of upper and lower lift arms 50, 60 to the center section 34 along a common vertical plane. With the arm ends 70 in each receiver 96 of bracket 92 directly vertically aligned with each other, the arm end 70 segments of the upper and lower lift arms 50, 60 may entirely overlap each other while the remainder of the upper and lower lift arms 50, 60 may slightly diverge from each other while extending toward the center section 34 based on the different angles of the ends (FIG. 3) of the corresponding link tubes 56, 66 (FIG. 4). A lift arm stop may be arranged in each of the brackets 92, shown here (but not labeled) with first and second perpendicularly arranged walls to respectively limit the lower and upper pivot movements of the upper and lower lift arms 50, 60.

Referring again to FIGS. 3-4, a torque member 100 may be defined by a weldment(s) that connects the left and right lower lift arms 60*a*, 60*b* to each other, which improves rigidity of the lift arm arrangement 32. Torque member 100 includes a torque member plate 102 that extends between inner ends 64 of the lower lift arms 60. As shown in FIG. 4, torque member plate 102 may define an angled lower plate of the torque member 100 that provides a crop deflector that acts as a crop deflecting ramp or other transition to the sprayer's belly pan. Side plates 104 extend from the inner to outer ends 64, 62 of the lower lift arms 60. Side plates 104 are shown here with generally triangular perimeter shapes that taper down from a greater height at the inner ends 64 of the lower lift arms 60 to a shorter height at the outer ends 62 of the lower lift arms 60. At the inner end 64, side plate(s) 104 may extend below the chassis lift arm mount(s) 90 and provide a lobe 106. The lobe 106 may have a pair of spaced apart walls, with the second wall behind the illustrated surface and not visible in this view, to provide a bracket or yoke-like configuration, for connecting the lift arm arrangement 32 to an actuator such as a hydraulic cylinder for moving the lift arms 50, 60 up and down to change the height of boom 30 (FIG. 1). Advancing the piston out of the hydraulic cylinder pushes the lobe 106 forward and pivots it about the connection between the lower lift arms 60 and chassis lift arm mount 90 to drive the lift arms 50, 60 to pivot upwardly and raise the boom 30 (FIG. 1). Retracting the piston into the hydraulic cylinder pulls the lobe 106 rearward and pivots it in the opposite direction about the connection between the lower lift arms 60 and chassis lift arm mount 90 to drive the lift arms 50, 60 to pivot downwardly and lower the boom 30 (FIG. 1).

As shown in FIG. 3, when viewed from above, torque member 100 may define a U-shaped body 110 with an upper recess defined by a perimeter with a lower perimeter wall segment that is defined by an outer edge of the torque member plate 102, and side perimeter wall segments are defined at least in part by respective side walls of the lower lift arms 60. Webbed gussets 112 may further define the U-shaped body by providing curved transitions between the lower lift arms 60 and the torque member plate 102, when viewed from above. In this way, the U-shaped profile provided by the torque member 100 is arranged generally horizontally and tilts or moves with movement of the lower lift arms 60 and boom 30 (FIG. 1), whereas the upside down U-shaped profile provided by the center section 34 is arranged generally vertically and substantially maintains this orientation during movement of the lower lift arms 60 and boom 30 (FIG. 1).

Figure 7:
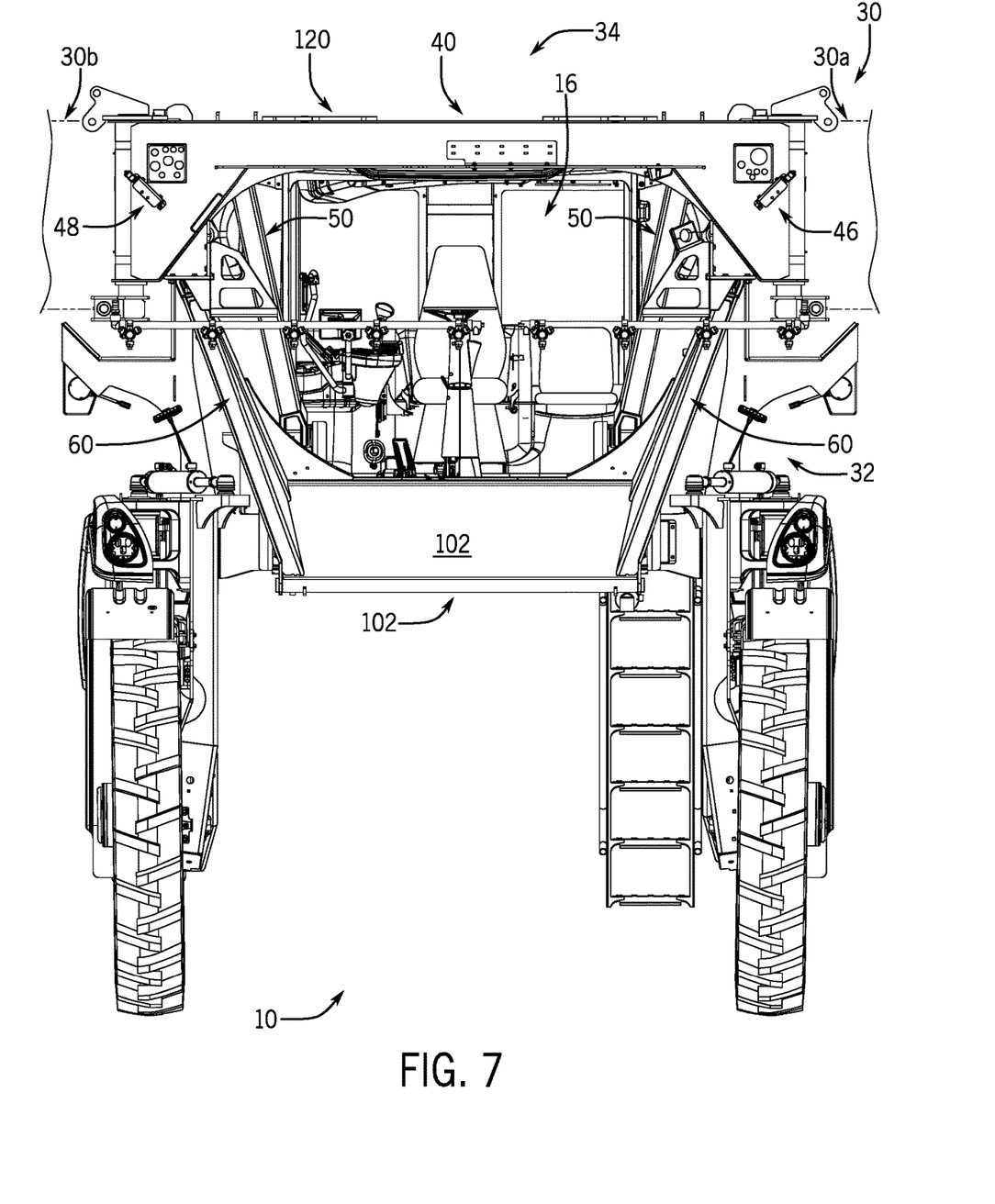
FIG. 7 is a front elevation view of a portion of the sprayer of FIG. 1.

Referring now to FIG. 7, this is a simplified schematic representation as an example of an improved field of view that is provided by the boom center section 34 and lift arm arrangement 32 when the boom is in a raised position, such as with the center section 34 above eye level of the operator. An under-boom field-of-view window is represented as window 120 that is defined as an opening that is bounded by structures of lift arm arrangement 32 and boom center section 34. The under-boom view window 120 is a continuously open space that extends vertically from an upper surface of the torque member 100 to a lower surface of the boom center section 34 and horizontally between the lift arms 50, 60 at the left and right sides of lift arm arrangement 32.

Figure 8:
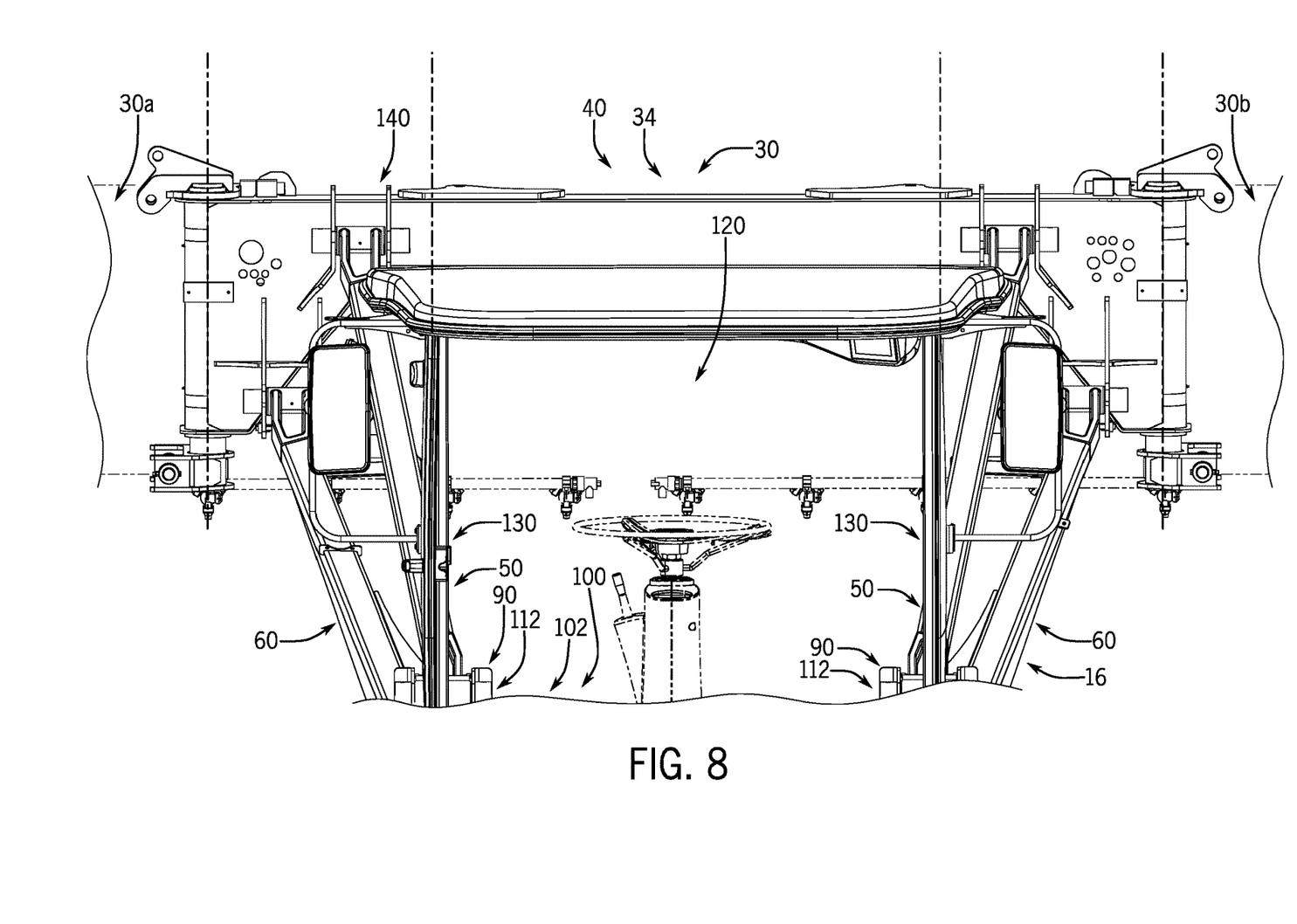
FIG. 8 is an elevation view looking forward under a boom from inside the cab of the sprayer of FIG. 1.

Referring now to FIG. 8, from inside the cab 16, at each of the left and right sides of the lift arm arrangement 32, the respective pair(s) of upper and lower lift arms 50, 60 are substantially align with each other and align with left and right A-pillars 130 of the cab 16 that extend from the cab's floor to roof and may support, for example, mirrors, door hinges or other cab components. As shown, when the boom 30 is in its raised position, from inside the cab 16, upper lift arms 50 appeared to extend substantially vertically straight up, parallel to and adjacent to A-pillars 130. Lower lift arms 60 are visually overlapped by the upper lift arms 50 and A-pillars 130. This arrangement collects all of the potentially view obstructing components of boom and boom support components into a single view columnar potential view obstruction or blocked zone 140 at each side of the cab 16. Such components are overlapped or stacked with respect to each other and with respect to the A-pillars within the operator's line of sight, which provides a visually overlapping stacked arrangement within zone 140 and less view obstruction than if the lift arms were parallel to each other or crisscross-overlapped each other. This reduces the width of such zone 140 and provides a wide field of view(s) out of the cab 16 that, along the height of the field of view, has an open viewable width in which boom-support components are transversely spaced from each other within the field of view by about the same width as the width between the cab A-pillars themselves, such as, for example, at least about ⅔ of the or greater of the width of the space between the A-pillars. The outwardly angled arrangement of the upper and lower lift arms 50, 60, with the wider spacing between the lower the arm 60 than the upper lift arms 50, provides an expanded viewable field from an operator seat in the cab 16. As shown in FIG. 8, this arrangement give the under-boom view window 120 a substantially rectangular shape with vertical walls that align with the cab A-pillars and rounded corners, with an inside space that is continuously open or free of major boom load-supporting structures so that a straight-ahead view of the operator is substantially unobstructed.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. A front-boom sprayer with a boom center section and lift arm arrangement for improved field of view, the front-boom sprayer, comprising:

a chassis that defines a front end and has wheels for moving the front-boom sprayer;

an application system supported by the chassis and including at least one product tank storing a volume of agricultural product for delivery onto an agricultural field;

a sprayer boom configured to deliver the volume of agricultural product to the agricultural field and that includes a boom center section;

a lift arm arrangement that connects the boom center section to the chassis front end and is configured to raise and lower the boom, wherein the lift arm arrangement includes;

a pair of upper lift arms projecting forwardly from the front end of the chassis and including:
   a left upper lift arm with an inner end connected to the chassis and an outer end that is connected to a left end of the boom center section at an upper portion of the boom center section;
   a right upper lift arm with an inner end connected to the chassis and an outer end that is connected to a right end of the boom center section at the upper portion of the boom center section;
a pair of lower lift arms projecting forwardly from the front end of the chassis and including:
   a left lower lift arm with an inner end connected to the chassis and an outer end that is connected to the left end of the boom center section at a lower portion of the boom center section;
   a right lower lift arm with an inner end connected to the chassis and an outer end that is connected to the right end of the boom center section at the lower portion of the boom center section; and
wherein:
   the inner end of the left upper lift arm and the inner end of the left lower lift arm are axially aligned along a first vertical axis:
   the inner end of the right upper lift arm and the inner end of the right lower lift arm are axially aligned along a second vertical axis:
   the outer ends of the left and right upper lift arms are spaced from each other by a first distance;
   the outer ends of the left and right lower lift arms are spaced from each other by a second distance that is greater than the first distance; and
   when the boom is in a raised position with the boom center section above an eye level of an operator in a cab of the sprayer, an under-boom field-of-view window is defined as an opening that is bounded from above by a lower edge of the boom center section at least partially bounded at left and right sides by a visually overlapped arrangement of the right upper lift arm overlapping the right lower lift arm and the left upper lift arm overlapping the left lower lift arm.

2. The front-boom sprayer of claim 1, wherein the left and right lower lift arms are arranged transversely outward of the left and right upper lift arms.

3. A front-boom sprayer with a boom center section and lift arm arrangement for improved field of view, the front boom sprayer, comprising:
a chassis that defines a front end and has wheels for moving the front-boom sprayer;
an application system supported by the chassis and including at least one product tank storing a volume of agricultural product for delivery onto an agricultural field;
a sprayer boom configured to deliver the volume of agricultural product to the agricultural field and that includes a boom center section;
a lift arm arrangement that connects the boom center section to the chassis front ends and is configured to raise and lower the boom; wherein the lift arm arrangement includes;
   a pair of upper lift arms projecting forwardly from the front end of the chassis and including;
      a left upper lift arm with an inner end connected to the chassis and an outer end that is connected to a left end of the boom center section at an upper portion of the boom center section; and
      a right upper lift arm with an inner end connected to the chassis and an outer end that is connected to a right end of the boom center section at the upper portion of the boom center section;
   a pair of lower lift arms projecting forwardly from the front end of the chassis and including;
      a left lower lift arm with an inner end connected to the chassis and an outer end that is connected to the left end of the boom center section at a lower portion of the boom center section; and
      a right lower lift arm with an inner end connected to the chassis and an outer end that is connected to the right end of the boom center section at the lower portion of the boom center section; and
   a torque member including a torque member plate that extends between inner ends of the left and right lower lift arms; and
wherein:
   the inner end of the left upper lift arm and the inner end of the left lower lift arm are axially aligned along a first vertical axis;
   the inner end of the right upper lift arm and the inner end of the right lower lift arm are axially aligned along a second vertical axis;
   the outer ends of the left and right upper lift arms are spaced from each other by a first distance:
   the outer ends of the left and right lower lift arms are spaced from each other by a second distance that is greater than the first distance; and
   when the boom is in a raised position with the boom center section above an eye level of an operator in a cab of the sprayer, an under-boom field-of-view window is defined as an opening that is bounded from above by a lower edge of the boom center section at least partially bounded, at left and right sides by a visually overlapped arrangement of the right upper lift arm overlapping the right lower lift arm and the left upper lift arm overlapping the left lower lift arm, and from below by the torque member plate.

* * * * *